July 8, 1941.   G. B. SHANKLIN ET AL   2,248,588
GAS FILLED CABLE INSTALLATION
Filed June 6, 1940
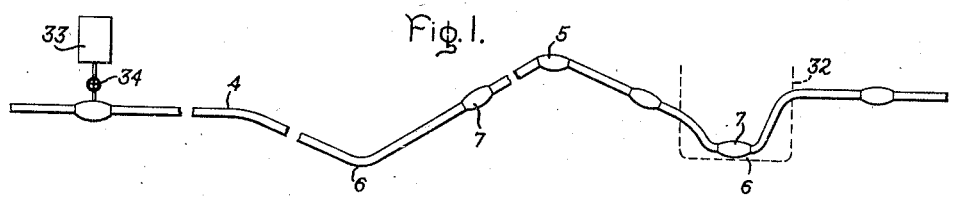
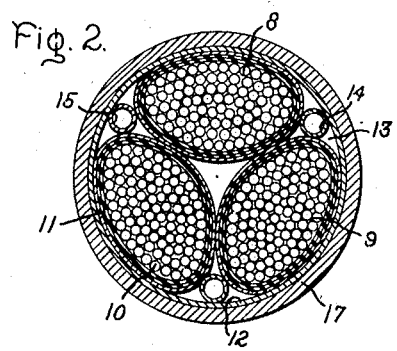
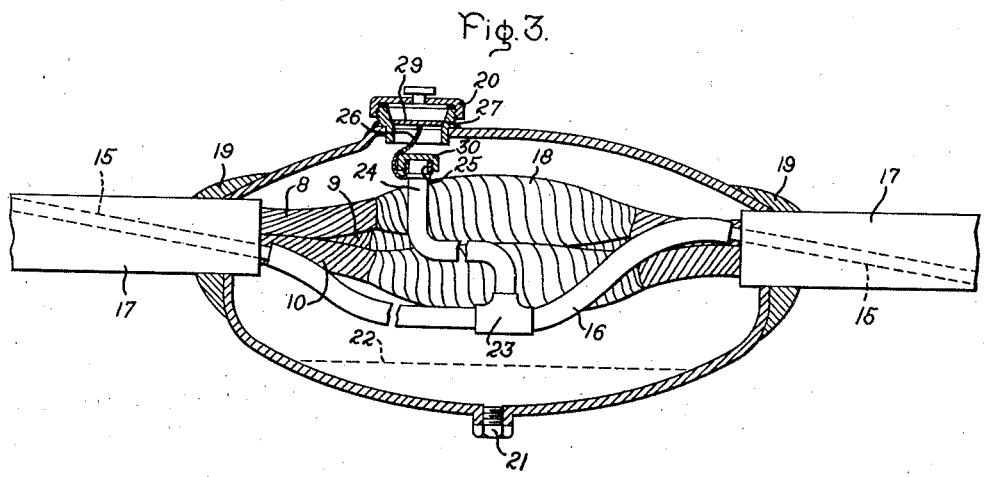
Inventors:
George B. Shanklin,
Vincent A. Sheals,
by Harry E. Dunham
Their Attorney.

Patented July 8, 1941

2,248,588

UNITED STATES PATENT OFFICE 2,248,588

GAS FILLED CABLE INSTALLATION

George B. Shanklin and Vincent A. Sheals, Schenectady, N. Y., assignors to General Electric Company, a corporation of New York Application June 6, 1940, Serial No. 339,134

5 Claims. (Cl. 174—21)

The present invention relates to installations of gas filled cables of the type having conductors located within a lead or equivalent sheath, the conductors being insulated with paper or equivalent material which is impregnated with a compound that has little tendency to ooze out of the paper. At some stage in the manufacture of the cable, the compound is permitted to drain as fully as possibly from the conductor coverings, to the end that the compound remaining within the sheath is retained in the insulation by capillary action. Within the sheath are one or more free channels in which a suitable gas is maintained under low positive pressure. A cable of this character is disclosed in the application for patent of George B. Shanklin, Serial No. 224,170, filed August 10, 1938. In addition to the channel or channels is a small diameter solid wall gas conveying tube extending from end to end of each conductor length or section of the cable as installed. The purpose of the tube is to convey gas and to cause it to by-pass any slugs of compound oozing out of the insulation into a channel during load cycles and which collects in low areas of the sheath, and at the same time permit the gas to act on opposite ends of the slugs or accumulated compound in the normally free channels.

The ground in which the cables are located may have a rugged profile with resulting high and low spots or areas. Also, because of installation conditions, there may be low spots due to the presence of pipes of various kinds buried in the streets which have to be avoided. Also, in the manholes the cables have bends which are desirable for reasons well understood in the cable industry. Whether due to one cause or another, the accumulation of compound slugs is objectionable. Because of the small diameter of the solid wall gas conveying tubes, they are easily plugged and hence it becomes important to prevent compound from entering them yet, on the other hand, the tubes must be readily accessible as for example for testing and other purposes if and when a leak in the sheath takes place accompanied by a loss of gas pressure.

Our invention has for one of its objects the provision of improved means for preventing access of compound to the solid wall gas conveying tube even though the joint casings between cable lengths become filled with compound and also for permitting access to the tube from outside of the casing whenever it becomes necessary or desirable for any purpose.

A further object of our invention is the provision of an improved arrangement of parts whereby the solid wall tube and other necessary parts may be located wholly within the cable enclosure, thereby avoiding the presence of external parts, which being relatively delicate as compared to the cable itself, would be easily damaged.

For a consideration of what we believe to be novel and our invention, attention is directed to the accompanying specification and the claims appended thereto.

In the drawing, Fig. 1 diagrammatically illustrates a rugged profile which the cable may have due to the character of the ground in which the cable is laid; Fig. 2 is a cross-section of the cable, and Fig. 3 is a joint between adjacent cable lengths.

In Fig. 1 of the drawing, 4 illustrates a cable which is filled with low pressure gas of the order of 10 to 15 pounds per square inch. It may be constructed as illustrated in Fig. 2, for example, which will be described later. Cables as installed in a system are rarely at the same level throughout the length thereof but have high spots, such as 5 and low spots, such as 6. The cable illustrated may be of any length. For some installations, it may be of the order of several miles. As a result of the changes in elevation, any compound oozing out of the insulation on the conductors at high points will flow by gravity through the free feed channels into the joint casing or casings 7 located at the low points. The cable lengths are connected or jointed end to end as usual, the joints being enclosed by suitable casings. Of these joints, some are of the type referred to as normal joints into which compound may drain due to heating caused by load cycles while others are so-called stop joints which may be necessary to limit the hydrostatic pressure where the cable is laid on a relatively steep slope and also to segregate the cable into sections to reduce loss of gas if leakage takes place. The presence of absence of stop joints will be determined by the profile of the cable installation and will follow good engineering practice in this particular. Gravity causes compound to move toward and be collected in these casing. If the accumulation of compound in the casings is small, no harm will be done but if the amount is great enough to largely or completely fill the chamber of the joint casings, trouble would ensue and hence means must be provided to prevent its entrance into the solid wall gas conveying tube. The tubes of necessity have such small bores that the compound could easily cause stoppage of gas flow therethrough.

Referring to Fig. 2 which illustrates one suitable form of gas filled cable, 8, 9 and 10 illustrate electrical conductors, each having a covering of insulation such as paper 11. The paper is impregnated with a compound which has little tendency to escape therefrom. The insulation at some stage in the manufacture of the cable is drained of compound as fully as possible. Surrounding the conductors is or may be a binding band 12. In the peripheral or filler spaces between conductors are permeable elements 14 forming free feed channels for gas and escaping compound made, for example, of flat steel coiled like spiral springs so as to have suitable spaces between turns. In addition they act as supports for the sheath. In one of the peripheral spaces in place of the coiled steel element is located a small solid wall gas conveying tube 15 made of copper, for example. The conductors are assembled in the form of a long pitch helix so that the channels and tube alternately appear on the top and bottom of the cable. As a result, the tube 15 may be at the top of one cable length and at the bottom of the connected cable as shown in Fig. 3. To take care of such a situation and also to connect the tubes in series, the opposed ends of the tubes where they extend into the joint casing are connected by a flexible means such as a tube 16 as will appear more fully later on. Surrounding the assembled conductors, the channels 13, tube 15 and binding bands 12, if and when the latter is used, is an impervious sheath 17 made of any suitable pressure resisting material of which lead is an example. The outer wall of the channels 14 is defined by the inner wall of the sheath as will be seen in Fig. 2.

Referring to Fig. 3, 8, 9 and 10 illustrate the insulated conductors which are splayed or separated to permit covering of the conductor joint connectors or sleeves with wrapped on insulation 18. The ends of the enclosing casing are secured to the cable sheaths by means which are both gas and liquid tight, as by wiped soldered joints 19, for example. The casing has one or more openings on its upper side which when the cable is in service are sealed with plugs or caps 20. The bottom of the casing also has an opening closed by a plug 21 through which the casing may be drained of any excess compound or liquid. Under normal conditions, the level of the compound is below the open ends of the cable sheaths and the free feed channels 14 as indicated by the dotted line 22. However, it is not always possible to prevent the chamber of the casing at a low point of the cable from being flooded with compound due first to an excess of oozing compound and second to the low portion of the cable. To prevent any flooding of the joint casing from causing compound to enter the solid wall tube 15 at its ends while at the same time rendering it accessible, the oposed ends of the tube are connected by a flexible pipe or tube 16 which, for example, may be made of lead but other materials may be employed, provided they do not adversely affect the gas within the cable or the compound. The pipe, if made of metal, may be soldered to the ends of the tubes 15. If made of other material, it may be slipped over the tube ends and bound or otherwise secured to form a gas-tight joint. In the pipe is a T 23 and rising therefrom is what for the purposes hereof may be termed a stand pipe 24. The connecting pipe 16 should be sufficiently flexible to permit the stand pipe to be sufficiently elevated to permit access thereto. The upper end of the stand pipe has a screw thread which may be formed in the wall of the pipe if thick enough but desirably a collar 25 is sweated to the pipe and externally threaded. To the upper end of the pipe, for example under the collar, is attached a metal chain or other flexible means 26 of sufficient length whereby the pipe may be pulled upwardly through the opening in the tubular member 27 which is sweated to the casing. The member is closed by a suitably packed screw threaded cap 28. The opening in the member is desirably enlarged outwardly, thereby to afford sufficient room to give free access to the end of the pipe when it is raised. The upper end of the chain is fastened in such manner that it is accessible from outside of the joint casing, as for example to the part 29 which is somewhat longer than the smallest diameter of the opening in the member 27, and desirably of such shape that it can be pulled out with a suitable tool to raise the tube 24. The screw threaded end of the stand pipe 24 has a tight fitting, screw threaded cap 30. The cap need not necessarily be applied where the joint is located in such position that the upper end of the pipe is always above the level of the compound collecting in the joint casing. Where the casing is so situated that there is or may be danger of liquid compound getting into the stand pipe, the cap should always be used. Because of the ability to seal the stand pipe, it follows that no compound can get into it or into the solid wall tube 15, no matter how low the joint is with respect to other parts of the cable. The dip in the cable indicated at 6 in Fig. 1 is an illustration of a condition which may easily occur. This dip may take place in a manhole indicated by the dotted lines 32 or elsewhere. With such a dip, there may be a hydrostatic pressure in the joint casing due to liquid heat of compound of the order of two pounds for example which would cause liquid to enter an open ended gas tube. The upper ends of the stand pipes in any of the numerous joint casings employed in the system or installation can easily be closed to prevent entrance of compound at any location where there may be danger of such entrance of compound.

Gas may be supplied to the free feed cable channels 14 and to solid wall tube 15 from a tank 33 subject to the control of a pressure reducing valve 34 which may be automatic in its action or hand controlled. In some instances, the cable and tube 15 may be supplied with gas, such as nitrogen, from only one tank located at an end of the cable or elsewhere. In other instances, gas may be supplied to the cable and tube 15 at other joints or to all of the joints.

Assuming that for any reason it becomes desirable to obtain access to the solid wall tube 15, the cap 28 on the member 27 is removed and the stand pipe 24 raised by the chain 26 to a point where it is accessible, after which it may readily be further raised to any reasonable height, the flexibility of the pipe 16 permitting this to be done. If the cap is on the end of the stand pipe, it will then be removed and gas under pressure may either be supplied thereto or removed therefrom. When all of the stand pipes are capped, the solid wall gas tubes 15 of all of the cable lengths are connected in series relation, and the parallel connected stand pipes 24 under this condition perform no function but are ready for service whenever occasion arises.

With the arrangement disclosed, any and all slugs of liquid compound located in low spots of the cable are by-passed by the gas tube 15, the gas however acts on the slugs from opposite ends through the supply contained in the joint casings.

By closing or capping the stand pipes 24 at each joint, existing slugs in the cable can be utilized to locate a leak in the sheath or joint casing by the pressure drop method. The use of a support for the upper end of each stand pipe insures keeping the end thereof near the top of the casing so that liquid draining into the casing will not get into the tube unless the casing was completely filled. By using caps on the stand pipes, even complete filling of the casing with compound will have no effect on the gas supplying tube 15. Closing of the ends of the stand pipes in the low areas will not affect the operation of the cable as a whole because the gas pressure will be maintained from the tops of adjacent joint casings on opposite sides of the slugs.

What we claim as new and desire to secure by Letters Patent of the United States is:

1. A cable installation comprising lengths of gas filled cable, compound therein normally retained in the insulation by capillary action, joints and casing therefor connecting the lengths, channels in each cable length opening into the casings of a pair of joints for conveying compound and gas, a solid wall gas conveying tube within each length for by-passing compound collected in a low portion of the channel, a flexible tubular connector located wholly within each of the casings for connecting the ends of adjacent tubes in series relation, a flexible stand pipe within each of the casings opening into the tubular connector at one end, the other end being normally open and rising above the normal level of any compound contained in the casing, a removable part for the casing, and means connected to the free end of each standpipe for raising it through the casing wall when said part is removed.

2. A cable installation comprising lengths of gas filled cable, compound therein normally retained in the insulation by capillary action, joints and casing therefor connecting the lengths, channels in each cable length opening into the casings of adjacent joints for conveying compound and gas, a solid wall gas conveying tube within each length by-passing compound collected in low spots of the channels, a flexible tubular connector located wholly within each of the casings for connecting the ends of tubes in series relation, a stand pipe within each of the casings opening into the tubular connector at one end and rising above the normal level of any compound contained in the casing, flexible means for limiting the sidewise movements of the stand pipe and also for permitting the elevation of its free end through an opening in the casing, and individually applied detachable caps for the stand pipes.

3. A cable installation comprising lengths of gas filled cable, each having conductor means having compound impregnated insulation therein, the compound being liquid at operating temperatures of the cable, joints uniting adjacent conductor lengths, impervious sheaths for the lengths, a casing enclosing each joint and sealed at its ends to the sheaths, the casing having an opening in the wall thereof, free feed channels within the sheaths into which compound is free to enter, the ends of the channels opening into the casings, a solid wall gas containing tube in each sheath for by-passing slugs of compound therein, a conduit within each casing connecting the tubes of adjacent lengths in series, a vertically movable pipe located wholly within each casing connected to the conduit at one end and open at the other end above the level of the channels, a normally closed chambered member secured to the outside of the casing over each pipe through which the free upper end of the pipe is accessible, and individual means for optionally closing or opening the upper ends of the pipes.

4. A cable installation comprising lengths of gas filled cable, each length having compound impregnated insulation on the conductors, an impervious sheath, joints for uniting the lengths, casings for the joints sealed to the sheaths of adjacent lengths, each casing having an opening in its wall, a normally free feed channel within the sheath of each length for conveying gas to the insulation and also receiving impregnating compound oozing from the surface of the insulation, the channels at their ends opening into the casings, a solid wall tube in each length for by-passing compound collected in the low area thereof, a conduit located in each of the joint casings for connecting adjacent ends of a pair of tubes in series relation, a vertical movable pipe within each casing opening into the conduit at its lower end and having an open upper end rising above the level of the channels in substantial alignment with the opening in the casing wall, the conduit and pipe collectively having yieldability, a normally closed chambered member secured to the outer wall of the casing and covering the opening therein, and means by which the upper end of the pipe may be moved into the chamber of the member to give access thereto.

5. A cable installation comprising lengths of gas filled cable, insulated conductors, compound therein normally retained within the confines of the insulation by capillary action, joints connecting the lengths, a casing for each joint having an opening in its wall, free feed channels in each cable length opening into the joint casings for conveying gas and compound, a solid gas conveying tube within each length for by-passing any slugs of compound contained in the channels, a conduit located wholly within each of the casings connecting adjacent ends of the tubes in series relation, a movable standpipe wholly within each of the casings opening at one end into the conduit and supported in its normal position thereby, the standpipe being open at its opposite end and located in substantial alignment with the opening in the casing wall, a normally closed cover member for the opening in the casing wall permitting access to the standpipe, a closing means accessible when the cover member is open for optionally closing or opening the upper end of the standpipe, and means connected to the standpipe and normally supported by the member for elevating the standpipe.

VINCENT A. SHEALS.
GEORGE B. SHANKLIN.